(No Model.)

E. DE PLANQUE.
ARTIST'S PANEL OR PLAQUE.

No. 319,203. Patented June 2, 1885.

WITNESSES:

INVENTOR:
E. De Planque
BY Munn &Co
ATTORNEYS.

UNITED STATES PATENT OFFICE.

EDWARD DE PLANQUE, OF HOBOKEN, NEW JERSEY.

ARTIST'S PANEL OR PLAQUE.

SPECIFICATION forming part of Letters Patent No. 319,203, dated June 2, 1885.

Application filed January 31, 1885. (No model.)

*To all whom it may concern:*

Be it known that I, EDWARD DE PLANQUE, of Hoboken, Hudson county, New Jersey, have invented a new and Improved Artist's Panel or Plaque, of which the following is a full, clear, and exact description.

The object of my invention is to provide a new and improved panel or plaque upon which paintings are to be produced.

The invention consists in a piece of pasteboard covered on both sides with shellac, on which a layer of whiting is applied, on which in turn a layer of japan is applied.

Reference is to be had to the accompanying drawings, forming a part of this specification, in which similar letters of reference indicate corresponding parts in both figures.

Figure 1:
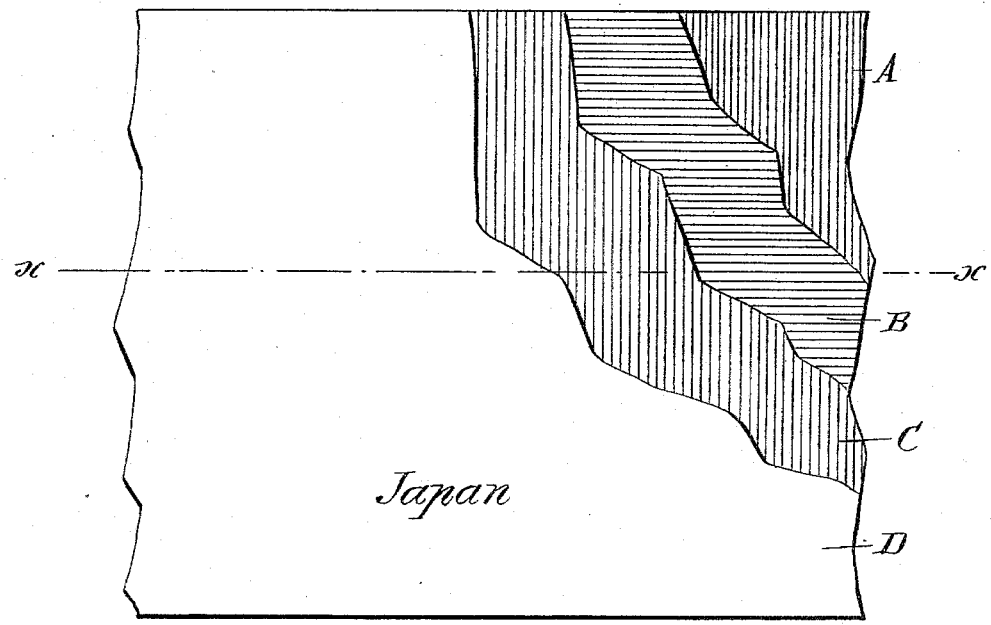
Figure 2:
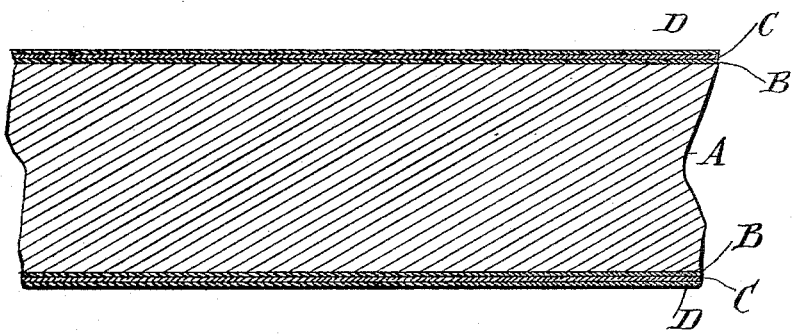

Figure 1 is a face view of a piece of my improved panel or plaque, and Fig. 2 is an enlarged cross-sectional view of the same on the line $x\,x$, Fig. 1.

The pasteboard A is provided on both surfaces with a thin layer, B, of shellac, which is covered by a thin layer, C, of whiting, which is sandpapered until it is perfectly smooth, and then the whiting is covered with japan, D, on which the paintings, &c., are produced. The panel or plaque may have any desired shape. The whiting prevents the japan from passing into the pores of the pasteboard, and the shellac prevents the peeling off of the whiting and japan.

My improved panel or plaque is cheaper than wood or metal, and does not crack or warp.

In place of pasteboard, leather-board or analogous material may be used.

Having thus described my invention, I claim as new and desire to secure by Letters Patent—

As an improved article of manufacture, a panel or plaque consisting of pasteboard having its surfaces provided with layers of shellac, whiting, and japan, as set forth.

EDWARD DE PLANQUE.

Witnesses:
OSCAR F. GUNZ,
C. SEDGWICK.